(No Model.) 3 Sheets—Sheet 1.
J. R. WILSON.
CORN HARVESTER.
No. 359,828. Patented Mar. 22, 1887.
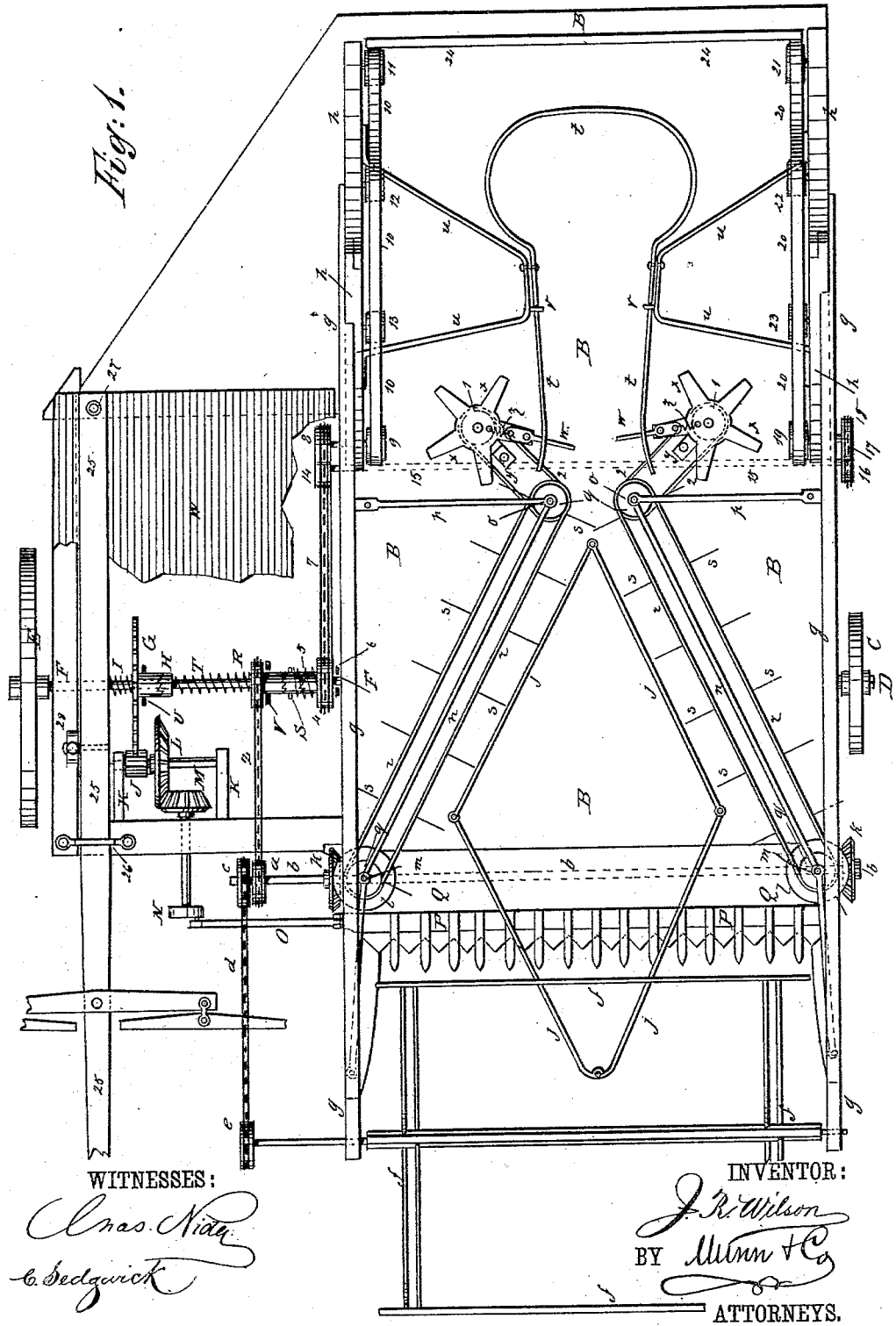
WITNESSES:
INVENTOR:
ATTORNEYS.

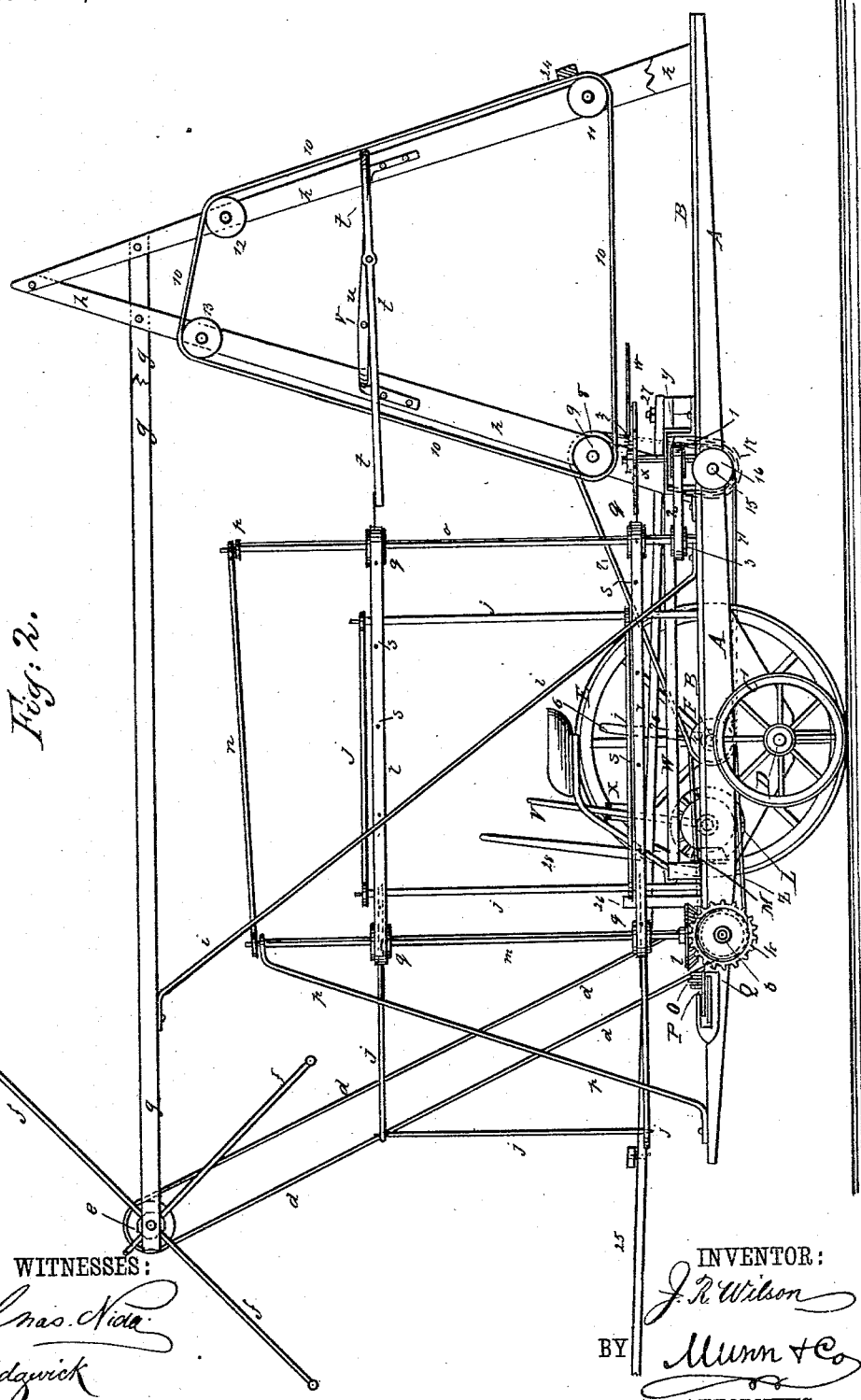

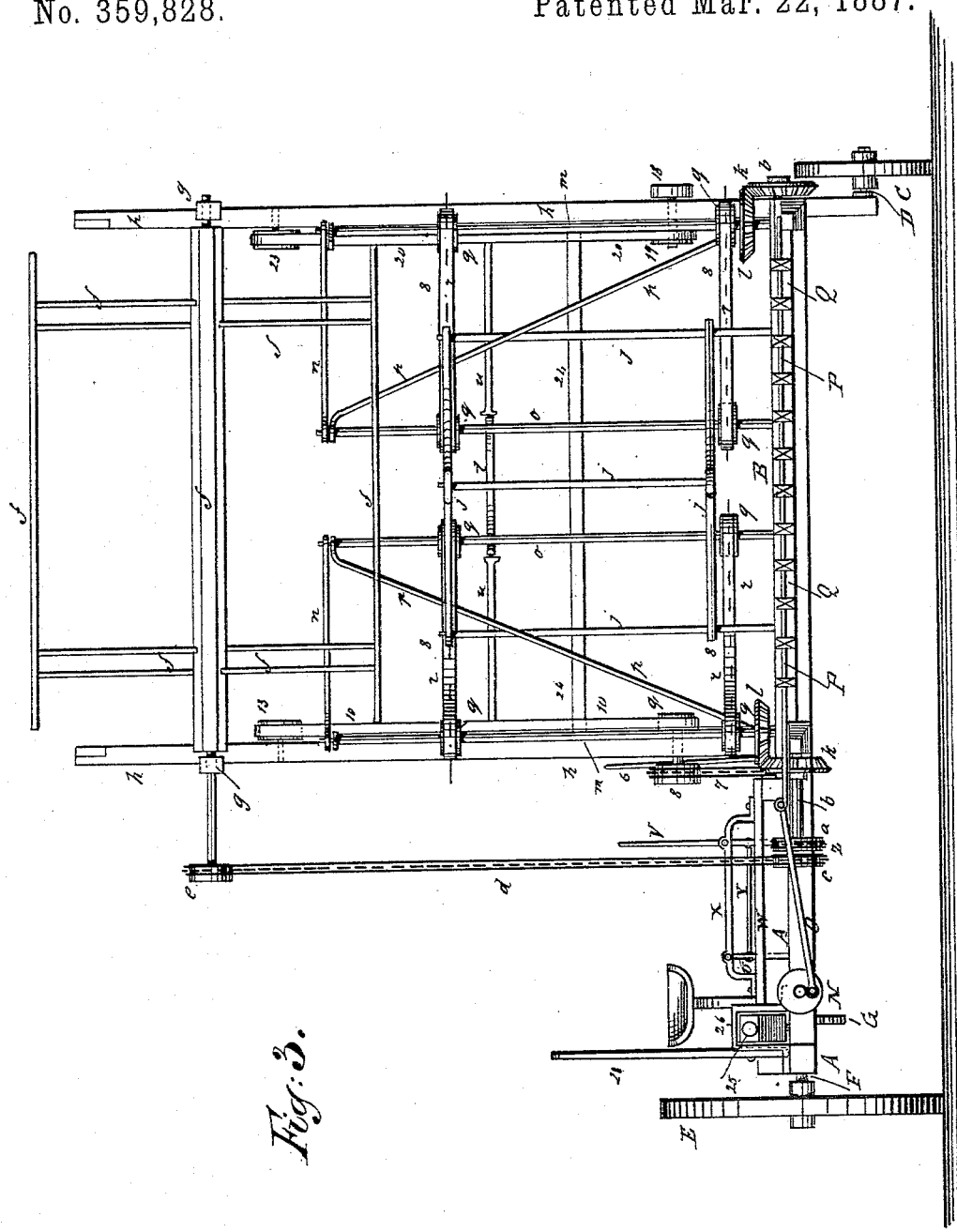

UNITED STATES PATENT OFFICE.

JOHN R. WILSON, OF FARMERSVILLE, OHIO.

CORN-HARVESTER.

SPECIFICATION forming part of Letters Patent No. 359,828, dated March 22, 1887.

Application filed September 24, 1885. Serial No. 178,079. (No model.)

*To all whom it may concern:*

Be it known that I, JOHN R. WILSON, of Farmersville, in the county of Montgomery and State of Ohio, have invented a new and useful Improvement in Corn-Harvesters, of which the following is a full, clear, and exact description.

Reference is to be had to the accompanying drawings, forming part of this specification, in which similar letters of reference indicate corresponding parts in all the figures.

Figure 1 is a plan view of one of my improved harvesters, part of the driver's platform being broken away. Fig. 2 is a side elevation of the same, partly in section. Fig. 3 is a front elevation of the same.

The object of this invention is to provide corn-harvesters constructed in such a manner as to cut the cornstalks, carry them back in a vertical position, collect them into a shock, and deposit the shock upon the ground.

The invention consists in the construction and combination of various parts of the machine, as will be hereinafter fully described, and then pointed out in the claims.

A represents the base-frame of the machine, and B is the platform attached to it. The machine is supported at one side by a small wheel, C, the axle D of which is permanently attached to the frame A. The other side of the machine is supported by a larger wheel, E, the axle F of which revolves in bearings attached to the frame A.

Upon the axle F is placed a gear-wheel, G, upon the inner end of the hub of which are formed clutch teeth to engage with the teeth of a clutch, H, attached to the axle F. The gear-wheel G is held in gear with the clutch H by a spiral spring, I, placed upon the axle F between the said gear-wheel and the side bar of the frame A. The teeth of the gear-wheel G mesh into the teeth of a pinion-wheel, J, journaled in supports K, attached to the front cross-bar of the frame A.

To the journal of the pinion-wheel J is rigidly attached a beveled gear-wheel, L, into the teeth of which mesh the teeth of the beveled gear-wheel M, journaled in the front cross-bar of the frame A.

To the projecting end of the forward journal of the beveled gear-wheel M is attached a crank-wheel, N, to the crank-pin of which is pivoted the outer end of a connecting-rod, O. The inner end of the connecting-rod O is hinged to the sickle-bar P, so that the said sickle-bar will be vibrated by the advance of the machine. The sickle-bar P slides in a groove in the finger-bar Q, attached to the front of the frame A.

Upon the axle F is placed a chain-wheel, R, having clutch-teeth upon the inner end of its hub to engage with a clutch, S, attached to the said axle F. The chain-wheel R is held in gear with the clutch S by a spiral spring, T, placed upon the said axle F and interposed between the clutch H and the said chain-wheel R.

The gear-wheel G and the chain-wheel R are thrown out of gear, when not required to operate, by a short lever, U, and a long lever, V, pivoted to the driver's platform W or to a support, X, attached to the said platform and connected by a bar, Y, so that both levers will be operated by operating the long lever, and both wheels will be thrown out of gear at the same time.

Around the chain-wheel R passes an endless chain, Z, which also passes around a chain-wheel, $a$, attached to the end of the shaft $b$. The shaft $b$ revolves in bearings attached to the front of the frame A, at the rear of the finger-bar Q, and to the said shaft is attached a chain-wheel, $c$, around which passes an endless chain, $d$. The endless chain $d$ also passes around a chain-wheel, $e$, attached to the end of the shaft of the reel $f$, so that the said reel will be driven from the drive-wheel axle F. The reel $f$ is journaled in bearings in the forward ends of the bars $g$, the rear ends of which are attached to the upper parts of the vertical angular frames $h$, secured to the opposite side parts of the frame A.

The reel-supporting bars $g$ are strengthened in position by braces $i$, the upper ends of which are attached to the forward parts of the said bars, and their lower ends are attached to the frame A.

To the forward part of the frame A is attached a rhomboidal frame, $j$, the forward angle of which projects in front of the sickle-bar P, to serve as a guide to separate the stalks of the two rows of corn and guide them into proper position to be cut and to enter the machine, while the rear angle of the said frame keeps the said stalks in a vertical position while being carried back along the platform B, and guides them into position to enter the shock-former, hereinafter described.

To the shaft $b$ are attached two beveled gear-wheels, k, the teeth of which mesh into the teeth of two beveled gear-wheels, l, attached to the lower parts of the vertical shafts m, placed at a little distance from and upon the outer sides and a little in front of the side posts of the frame j. The lower ends of the shafts m revolve in bearings in the frame A, and their upper ends revolve in bearings in the forward ends of the connecting-bars n. The connecting-bars n are placed about parallel with the sides of the angular rear part of the frame j, and in bearings in their rear ends revolve the upper ends of the shafts o. The shafts o are placed upon the opposite sides and in the rear of and at a little distance from the rear post of the frame j, and at a little distance from each other, so that the stalks can pass to and between the said shafts o. The lower ends of the shafts o revolve in bearings in the frame A. The upper ends of the shafts m o also revolve in bearings in the upper ends of the brace-bars p, the lower ends of which are attached to the frame A, and by which, in connection with the bars n, the said shafts m o are held in vertical positions.

To the upper and lower parts of the vertical shafts m o are attached pulleys q, around which pass endless bands r. To the endless bands r are attached spikes s, of such a length as to project to or nearly to the sides of the rear part of the guide-frame j, so that the said spikes will carry the stalks back in an erect position and force them through the space between the shafts o into the space between the arms of the shock-former t. The shock-former t is made of a bar bent at its middle part into a nearly-circular loop, having its arms extended forward nearly parallel and having the forward ends of the said arms bent outward, as shown in Fig. 1. The former t, at the rear parts of the arms, is pivoted to the brackets u, attached to the middle parts of the angular frames h. The rear or loop part of the shock-former t is the heavier, and the said shock-former is held from dropping below a horizontal position by stop-pins v, attached to the brackets u, and against which the arms of the said shock-former strike, as shown in Figs. 1 and 2. As the stalks enter the space between the arms of the shock-former t the lower parts of the said stalks are pushed back into the said shock-former by levers w, pivoted to the radial arms of wheels x, journaled to the platform B and to supports y, attached to the said platform. With the inner ends of the levers w are connected the outer ends of spiral springs z, or other suitable springs, the inner ends of which are attached to the middle parts of the wheels x, so that the outer parts of the said levers can yield should they meet too much resistance and slide past the obstruction. The lever-wheels x are placed at the outer sides of the arms of the shock-former t, and to their journals are attached pulleys 1, around which pass endless bands 2. The endless bands 2 also pass around pulleys 3, attached to the lower parts of the vertical shafts o, so that the lever-carrying wheels x will be driven from the said shafts.

Upon the inner part of the axle F is placed a chain-wheel, 4, which has clutch-teeth upon the outer end of its hub to engage with the teeth of the clutch S, attached to the said axle. The chain-wheel 4 is held out of gear with the clutch S by a spiral spring, 5, one end of which rests against the projecting ends of the pin that secures the said clutch to the axle F or against other suitable support. The other end of the spring 5 rests against the outer side of the chain-wheel 4. The chain-wheel 4 is thrown into gear with the clutch S by means of a lever, 6, pivoted to the driver's platform W or to a support attached to the said platform. Around the chain-wheel 4 passes an endless chain, 7, which also passes around a chain-wheel, 8, journaled to the lower part of the outer side of the forward inclined post of the angular frame h.

To the journal of the chain-wheel 8, at the inner side of the angular frame h, is attached a pulley, 9, around which passes an endless band, 10. The endless band 10 also passes around pulleys 11 12 13, journaled to the inner side of the angular frame h. The endless chain 7 also passes around a chain-wheel, 14, attached to the end of the shaft 15, which revolves in bearings in the frame A, and to its other end is attached a chain-wheel, 16. Around the chain-wheel 16 passes an endless chain, 17, which also passes around a chain-wheel, 18, journaled to the outer side of the inclined forward post of the angular frame h.

To the journal of the chain-wheel 18, at the inner side of the frame h, is attached a band, 19, around which passes an endless band, 20. The endless band 20 also passes around the pulleys 21 22 23, journaled to the inner side of the angular frame h. The pulleys 9 11 12 13 and the chain-wheels 19 21 22 23 are placed in corresponding positions, so that the corresponding parts of the endless bands 10 20 will be parallel with each other.

To the endless bands 10 20 are attached the ends of a cross-bar, 24, which is carried around by and with the said endless bands. As the cross-bar 24 is carried down the inclined forward posts of the angular frames h it comes in contact with the arms of the former t and raises the loop or bend of the said shock-former t, so that the shock of corn can pass out from beneath it, when the said former t drops back to its former position. As the cross-bar 24 is carried back from the pulleys 9 19 to the pulleys 11 21, it pushes the shock of corn off the platform B.

25 is the tongue to which the draft is applied, by means of which the machine is guided and controlled. The tongue 25 passes through a high keeper, 26, attached to the right-hand end of the front cross-bar of the frame A, and its rear end is hinged to a cross-bar of the frame A at the end of the driver's platform W by a bolt, 27, or other suitable means. To the side of the tongue 25, a little in the rear of the keeper 26, is pivoted a lever, 28, at a little distance from one end. The tongue 25 and the lever 28 are so arranged that when the said lever is in a vertical position, with the end of its short arm resting upon the side bar of the frame A, the said frame will be horizontal and in a position to cut the corn.

With this construction, when the unloading mechanism is set in motion, the lever 28 is turned into a horizontal position, which allows the weight of the corn-shock to tilt the machine to the rearward, so that the said corn-shock can be more readily pushed from the platform B. When the corn-shock has been discharged, the unloading mechanism is thrown out of gear, and the lever 28 is turned into a vertical position, which brings the machine back into a horizontal position, ready to cut another shock.

The entire platform may be faced with sheet-iron, to lessen the friction as the cornstalks are moved back over the said platform, which facing-plate may be turned up at the sides of the machine to form flanges.

It will of course be understood that the bands and pulleys and chains and chain-wheels are considered full equivalents one of the other, and I do not limit myself to the use of either.

Having thus described my invention, what I claim as new, and desire to secure by Letters Patent, is—

1. In a corn-harvester, the combination, with the platform and the cutting mechanism at the forward end thereof, of the rhomboidal frame on the platform, the forward angle of the said frame extending to or beyond the cutters, the inclined carriers at opposite sides of the rear part of said frame, and a shock-former adjacent to the converging ends of the said carriers, substantially as set forth.

2. The combination, with the platform, cutting mechanism at the forward end thereof, of the rhomboidal frame, the forward angle of which extends to or beyond the cutters, the carriers at opposite sides of the rear half of the said frame and parallel therewith, the shock-former adjacent to the converging ends of the carriers, and a pushing mechanism at the mouth or open end of the said shock-former, substantially as set forth.

3. The combination, with the platform and its cutting mechanism, of the rhomboidal frame, the forward angle of which extends to or beyond the cutters, vertical shafts having horizontal pulleys at opposite sides of the rear half of said frame, endless carriers on said pulleys converging at the rear pulleys, a vertically-swinging shock-former having a closed rear end and approximately parallel forwardly-extending arms extending adjacent to the converging ends of the carriers to receive the stalks therefrom, mechanism for throwing the said arms downward, and a pushing mechanism for moving the stalks rearward from between said arms to the closed end of the shock-former, substantially as set forth.

4. The combination, with the frame and the cutting and carrier mechanism, of the pivoted vertically-swinging shock-former having a closed rear end and approximately parallel arms extending adjacent to the delivery end of the carrier mechanism to receive the stalks therefrom, vertical frames at opposite sides of the shock-former, upper and lower pulleys on the opposite bars of said frames, endless belts passing around said pulleys, and a cross-bar connecting said belts, the arms of the shock-former being in the path of the said cross-bar, substantially as set forth.

5. The combination, with the platform, the cutting and carrier mechanism, and the shock-former constructed to receive the stalks from said carrier mechanism, of the horizontally-rotating wheels at opposite sides of the open end of the shock-former and independent of said carrier mechanism, and pivoted yielding pusher-arms mounted on said wheels, substantially as and for the purpose set forth.

6. The combination, with the platform having the cutting mechanism at its forward end, the rhomboidal frame projecting at its forward end to or beyond the cutters to separate the stalks, and the carriers at opposite sides of and parallel with the rear half of the said frame, of the vertically-swinging counterbalanced shock-former provided with forwardly-extending guide-arms to receive the stalks from the carriers, pusher-levers extending into the space between said arms, vertically and forwardly moving endless belts at opposite sides of the shock-former, and a cross-bar connecting said belts and constructed to operate the former, substantially as set forth.

7. In a corn-harvester, the combination, with the frame A, the platform B, the rhomboidal frame j, the vertical shafts m o, and their connecting-bars n, braces p, pulleys q, and endless bands r, provided with spikes s, of the angular frames h, the brackets u, having stop-pins v, the shock-former t, and the armed wheels x, having spring-levers w z, and a driving mechanism, substantially as herein shown and described, whereby the cut corn is gathered into a shock, as set forth.

8. In a corn-harvester, the combination, with the frame A, the angular frames h, and the rotary axle F, of the chain-wheels 4 14 8 and endless chain 7, the shaft 15, chain-wheels 16 18 and endless chain 17, the pulleys 9 11 12 13 and 19 21 22 23 and endless bands 10 20, and the cross-bar 24, attached to the said endless chains, substantially as herein shown and described, whereby the shock-former is raised from the shock and the shock is pushed from the platform, as set forth.

JOHN R. WILSON.

Witnesses:
J. R. LINDEMUTH,
W. H. PULS.